United States Patent [19]

Mengler et al.

[11] 3,904,688

[45] Sept. 9, 1975

[54] CONTINUOUS PROCESS FOR THE PRODUCTION OF 1,1,6,6-TETRAISOPROPYL-2,5-DIAZA-1,5-HEXADIENE

[75] Inventors: Claus-Dieter Mengler, Dorsten; Hans-Peter Schüller, Marl, both of Germany

[73] Assignee: Chemische Werke Huls Aktiengesellschaft, Marl, Germany

[22] Filed: Oct. 14, 1971

[21] Appl. No.: 189,117

[30] Foreign Application Priority Data

Oct. 15, 1970 Germany............................ 2050548

[52] U.S. Cl............................................. 260/566 R
[51] Int. Cl............................................ C07c 119/00
[58] Field of Search................................ 260/566 R

[56] References Cited
UNITED STATES PATENTS
2,533,723   12/1950   Dombrow...................... 260/566 R

OTHER PUBLICATIONS

Smith, "Open Chain Nitrogen Compounds," Vol. 1, p. pg. 329, (1965).

Luder et al., "General Chemistry," pp. 181–182, (1959).

*Primary Examiner*—Gerald A. Schwartz
*Attorney, Agent, or Firm*—Millen, Raptes & White

[57] ABSTRACT

A continuous process for the production of 1,1,6,6-tetraisopropyl-2,5-diaza-1,5-hexadiene, a curing agent for perfluoropropene/vinylidene fluoride copolymers, by the reaction of diisopropyl ketone with ethylenediamine in the presence of an acidic catalyst at about 130°–270° C. with the azeotropic removal of the water of reaction wherein the yield of 1,1,6,6-tetraisopropyl-2,5-diaza-1,5-hexadiene is increased by the removal thereof from the reaction zone so as to maintain the amount therein relative to the amount of unreacted starting materials in the reaction zone at below 60 percent of theoretical.

12 Claims, 1 Drawing Figure

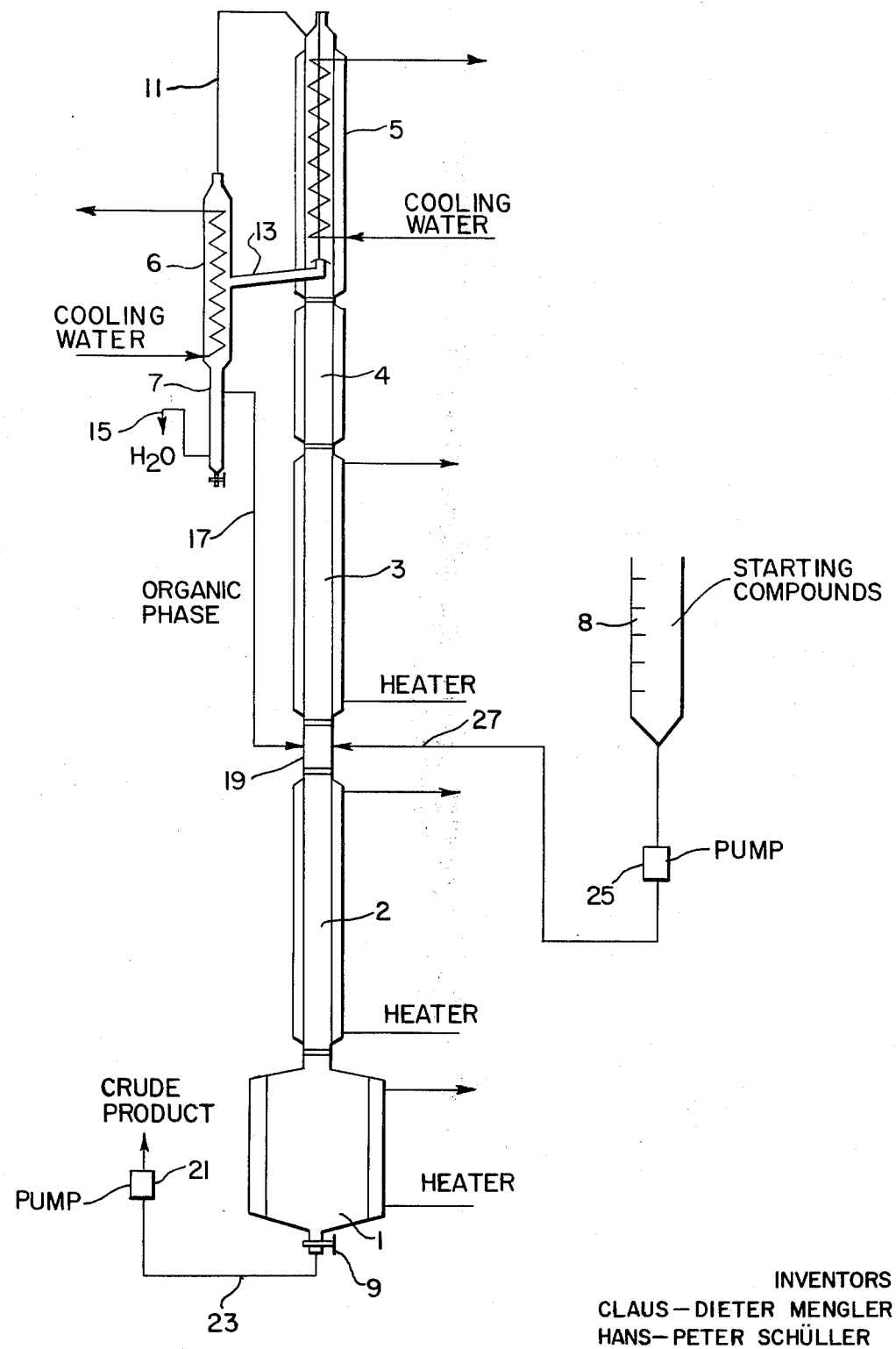

CONTINUOUS PROCESS FOR THE PRODUCTION OF 1,1,6,6-TETRAISOPROPYL-2,5-DIAZA-1,5-HEXADIENE

BACKGROUND OF THE INVENTION

This invention relates to a process for the continuous preparation of 1,1,6,6-tetraisopropyl-2,5-diaza-1,5-hexadiene.

The reaction of ketones with amines to form ketimines has long been known. (U.S. Patent No. 2,533,723) According to the processes known heretofore, the reaction is conducted in the presence or in the absence of a dehydration catalyst, the water of reaction being customarily removed from the reaction mixture with the aid of an azeotropic agent.

We have found that in the preparation of 1,1,6,6-tetraisopropyl-2,5-diaza-1,5-hexadiene on a commercial scale by this reaction, the reaction terminated at a 60 percent conversion, although the water of reaction was removed from the reaction mixture.

Accordingly, it is an object of the present invention to produce 1,1,6,6-tetraisopropyl-2,5-diaza-1,5-hexadiene from diisopropyl ketone and ethylenediamine in a higher than 60 percent conversion. It is another object to achieve this conversion without the production of by-products. Other objects will be apparent to those skilled in the art to which this invention pertains.

SUMMARY OF THE INVENTION

According to this invention, 1,1,6,6-tetraisopropyl-2,5-diaza-1,5-hexadiene is produced by the reaction of diisopropyl ketone and ethylenediamine, employing a conventional acidic dehydration catalyst and removing the water of reaction azeotropically, in greater than 60 percent yield by conducting the reaction continuously in a reaction zone maintained at 130°–270° C. and removing the 1,1,6,6-tetraisopropyl-2,5-diazo-1,5-hexadiene from the reaction zone at a rate which maintains an amount thereof in the reaction zone, calculated on the proportion thereof to the unreacted starting ketone and amine therein at below 60 percent of theoretical.

DETAILED DISCUSSION

Because the reaction of the process of this invention is an equilibrium reaction, it was assumed that the reaction would go to completion by removing the water of reaction. Also, the prior art did not give any suggestion that the reaction would proceed abnormally. It was therefore surprising to discover that the reaction terminated after the formation of about 60 percent of the theoretically possible quantity of the desired product. Varying the reaction temperature or the catalyst employed did not produce any improvement in yield, nor employing an excess of the stoichiometrically required amount also did not improve yield. It was therefore contrary to all expectations to discover that when, in addition to the water of reaction, the 1,1,6,6-tetraisopropyl-2,5-diaza-1,5-hexadiene is removed from the reaction mixture so that the latter is maintained therein at a concentration below the critical 60 percent limit, the reaction proceeds beyond a 60 percent yield.

In the process of this invention, ethylenediamine and diisopropyl ketone are employed in a molar ratio of approximately 1 : 2. Suitable acidic catalysts for the reaction are, for example, silica gel, acidic silicates, phosphoric acid, p-toluenesulfonic acid, acidic aluminum oxide and sulfuric acid.

Examples of suitable azeotropic agents are benzene, toluene or a large excess of diisopropyl ketone. Xylene is preferred.

The reaction temperatures are maintained above the boiling point of the starting compounds but below the boiling point limit of the final product, i.e., in the range of 130°–270° C.

The reaction can be conducted in any desired apparatus in which the conditions of the process of this invention can be effected. When conducting the continuously operating examples of this invention, described hereinafter, the apparatus shown schematically in the drawing was employed.

As shown in the drawing, three column tubes 2, 3, 4 and a column head 5 are attached to a sump vessel 1 provided with a heating jacket and a bottom valve 9. The uppermost column tube 4 is provided with a vacuum jacket; the first two column tubes 2, 3 are heated and constructed so as to maintain the reaction catalyst therein. A cooler 6, provided with a water trap 7, is connected by conduit 11 to the top of column head 5 and by recycle conduit 13 to the bottom of column head 5. Water is withdrawn from the bottom of water trap 7 through conduit 15. An organic phase recycle conduit 17 connects the top of water trap 7 to a column connector 19 positioned between columns 2 and 3. A pump 21 for removing crude product from sump vessel 1 is connected to valve 9 by conduit 23. A pump 25 for pumping starting compounds from a storage tank 8 is connected to column connector 19 by conduit 27.

In operation, storage tank 8 is charged with diisopropyl ketone and ethylenediamine in a 2 : 1 molar ratio. Column tubes 2 and 3 are filled with about 2.5 liters of catalyst.

First column tube 2 is heated with the aid of a heating jacket to 130°–200° C., preferably 150°–160° C. The temperature of second column tube 3 is maintained at 0°–60°, preferably 30°–40°, above the boiling temperature of the azeotrope of the water of reaction and selected azeotropic agent. Unheated last column tube 4, which is preferably a packed column, serves as the rectifying column for the rectification of this azeoptrope as it passes through the column. Column head 5 is cooled so as to automatically maintain a predetermined reflux ratio, e.g., 0–4 : 1, preferably about 1–2 : 1. The operation is switched to total reflux when the temperature in column head 5 is 0°–10°, preferably 1°–5°, above the boiling point of the water of reaction-azeotropic agent mixture. The water of reaction and azeotropic agent which passes through column head 5 is transferred via conduit 11 to cooler 6, where a portion passes into water trap 7 and a portion returns via conduit 13 into the bottom of column head 5.

The mixture of diisopropyl ketone and ethylenediamine is introduced into column connector 19 by pump 25 from storage tank 8. The amount per unit time which can be introduced is dependent on the activity of the catalyst and is regulated so that column tubes 3 and 4 are not flooded with starting compounds. In the start-up operation, sump vessel 1 is charged with a mixture of diisopropyl ketone and ethylenediamine, in a 2 : 1 molar ratio, along with sufficient azeotropic agent to permit removal of the water of reaction. The temperature in the sump vessel is set to 130°–270° C., preferably 190°–210° C. An especially advantageous sump temperature is about 200° C. If, in the start-up operation, sump vessel 1 is charged with a mixture of starting compounds rather than the residue of a previous operation, additional starting compounds are not introduced between tubes 2 and 3 until the boiling temperature of the contents of sump vessel 1 has reached at least 190° C.

When the contents of the equipment reach operating temperature in sump vessel 1, columns 2, 3 and 4 and column head 5, a stream of reactants is introduced, preferably continuously, into column connector 19 and a stream of product is withdrawn, preferably continuously, at a rate which balances the input of starting materials, i.e., so that the volume of product in sump vessel 1 is maintained relatively constant.

The crude product removed from sump vessel 1 by pump 21 can be purified by distillation under reduced pressure through a distillation bridge or a short rectifying column of 1–5 theoretical plates.

The product of this process is useful as a latent curing agent and cross-linking agent. Anspach, W. F., Rubber Chem. Techn. 39 (1966) 1200–14, describes its use as a curing agent for an elastomeric terpolymer of perfluoropropene, vinylidene fluoride and another monomer and for a liquid copolymer of perfluoropropene and vinylidene fluoride.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

COMPARATIVE EXAMPLE 1

Charge:
18 mol (2050 g.) of diisopropyl ketone
9 mol (540 g.) of ethylenediamine
250 ml. of xylene
10 g. of p-toluenesulfonic acid The components were refluxed in a 4 liter agitator-equipped flask with a column attached thereto (100 × 25 mm., 4 mm. Raschig rings) fitted with a reflux separator and water trap. The separation of the water in the water trap was measured quantitatively. After water separation had ceased, the charge was distilled over a distillation bridge. In addition to xylene and unreacted starting compounds, 1,191 g. (≅ 52.4%) of 1,1,6,6-tetraisopropyl-2,5-diaza-1,5-hexadiene was obtained, b.p. 95° C./0.4 mm.

COMPARATIVE EXAMPLE 2

Charge:
18 mol (2050 g.) of diisopropyl ketone
9 mol (540 g.) of ethylenediamine
250 ml. of benzene
10 g. of p-toluenesulfonic acid The components were reacted in the manner described in Comparative Example 1. Distillation yielded 54.0 percent of theory of 1,1,6,6-tetraisopropyl-2,5-diaza-1,5-hexadiene.

COMPARATIVE EXAMPLE 3

Charge:
10 mol (1140 g.) of diisopropyl ketone
5 mol (300 g.) of ethylenediamine
1260 g. of xylene
5 g. of p-toluenesulfonic acid The components were reacted in accordance with Comparative Example 1. Distillation yielded 52.6 percent of theory of 1,1,6,6-tetraisopropyl-2,5-diaza-1,5-hexadiene.

COMPARATIVE EXAMPLE 4

Charge:
18 mol (2050 g.) of diisopropyl ketone
4.5 mol (270 g.) of ethylenediamine
250 ml. of xylene
10 g. of p-toluenesulfonic acid The components were reacted in accordance with Comparative Example 1. The distillation yielded 55.6 percent of theory of 1,1,6,6-tetraisopropyl-2,5-diaza-1,5-hexadiene.

COMPARATIVE EXAMPLE 5

Charge:
9 mol (1025 g.) of diisopropyl ketone
4.5 mol (270 g.) of ethylenediamine
4.5 mol (1135 g.) of 1,1,6,6-tetraisopropyl-2,5-diaza-1,5-hexadiene
250 ml. of xylene
10 g. of p-toluenesulfonic acid The components were reacted in accordance with Comparative Example 1. Within 16 hours, 12 ml. (7.4% of theory) of water was obtained. The distillation yielded 1098 g. (96.8%) of the 1,1,6,6-tetraisopropyl-2,5-diaza-1,5-hexadiene present in the starting charge.

EXAMPLE 1

Column tubes 2 and 3 of the above-described apparatus are packed with 2.4 l. of silica gel. The sump vessel is filled with a mixture of diisopropyl ketone and ethylenediamine in a molar ratio of 2 : 1, along with 200 ml. of xylene. The sump charge is first reacted under the following conditions, with water being entrained therefrom.

| Temperatures: | Sump | 190° C. |
|---|---|---|
| | Column tube 2 about | 155° C. |
| | Column tube 3 about | 130° C. |
| Head boiling limit: | 93° C. | |
| Reflux ratio: 1 : 1 | | |

When the sump product reaches a temperature of about 190° C., 2,280 g. (20 mol) of diisopropyl ketone and 600 g. (10 mol) of ethylenediamine, together totaling 3,540 ml., is introduced over a period of 12.5 hours (280 ml./hour) between 2 and 3. A corresponding quantity of crude product is removed at the same rate from sump vessel 1 by pump 21 through bottom valve 9. From this crude product, after distillation via a bridge, 2,160 g. (85.7% of theory) of 1,1,6,6-tetraisopropyl-2,5-diaza-1,5-hexadiene having a purity of 95 percent is obtained, in addition to unreacted ketone-amine mixture. The space-time yield is 72 g. per liter-hour.

EXAMPLE 2

In the manner described in Example 1, 2,280 g. of diisopropyl ketone (20 mol) and 600 g. of ethylenediamine (10 mol) are reacted over a period of 12 hours (metered feed: 295 ml./h.) on 2.5 l. of KO catalyst, an acid-activated montmorillonite. Distillation yields 2,235 g. (88.7% of theory) of 1,1,6,6-tetraisopropyl-2,5-diaza-1,5-hexadiene. Spacetime yield: 74.5 g./l · h.

EXAMPLE 3

In the manner described in Example 1, 6.78 mol of diisopropyl ketone and 3.39 mol of ethylenediamine are reacted over a period of 17 hours (metered feed: 70 ml./hour) in a smaller apparatus with 0.4 l. of catalyst volume of γ-aluminum oxide cords at the same temperatures as those of Example 1. The yield of distilled product is 516 g. (60.5% of theory).

Space-time yield: 75.7 g./l · h.

EXAMPLE 4

In the manner described in Example 3, 6.22 mol of diisopropyl ketone and 3.11 mol of ethylenediamine are reacted over a period of 19 hours (metered feed: 58 ml./hour) using 0.4 l. of still catalyst (phosphoric acid on a ceramic support). The yield of distilled product is 481 g. (61.5% of theory).

Space-time yield: 63.3 g./l · h.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of 1,1,6,6-tetraisopropyl-2,5-diaza-1,5-hexadiene by reacting diisopropyl ketone with ethylenediamine in about a 2:1 molar ratio in the presence of a conventional acidic dehydration catalyst while removing the water of reaction azeotropically, the improvement which comprises conducting the reaction continuously in a reaction zone maintained at about 130°–270° C. and removing the 1,1,6,6-tetraisopropyl-2,5-diaza-1,5-hexadiene from the reaction zone at a rate such that the amount of 1,1,6,6-tetraisopropyl-2,5-diaza-1,5-hexadiene in the reaction zone is maintained at below 60 percent of theoretical, calculated on the proportion thereof to the unreacted starting ketone and amine in the reaction zone.

2. A process according to claim 1 wherein xylene is used to remove the water of reaction azeotropically.

3. A process according to claim 1 wherein the acidic catalyst is selected from the group consisting of silica gel, acidic silicates, phosphoric acid, p-toluenesulfonic acid, acidic aluminum oxide and sulfuric acid.

4. A process according to claim 1 wherein the first portion of the reaction zone into which the reactants are introduced is maintained at about 150°–160° C. and the second portion of the reaction zone from which the 1,1,6,6-tetraisopropyl-2,5-diaza-1,5-hexadiene is removed is maintained at about 190°–210° C.

5. A process according to claim 3 wherein the azeotropic mixture is passed through a third portion of the reaction zone maintained at about 30°–40° C. above the boiling point of the azeotropic mixture before being condensed and the water of reaction separated therefrom.

6. A process according to claim 5 wherein the second zone is maintained at about 200° C.

7. A process according to claim 5 wherein xylene is used to remove the water of reaction azeotropically.

8. A process according to claim 5 wherein the third zone is maintained at about 93° maximum.

9. A process according to claim 1 wherein the acidic catalyst is silica gel.

10. A process according to claim 1 wherein the acidic catalyst is acid activated montmorillonite.

11. A process according to claim 1 wherein the acidic catalyst is aluminum oxide cords.

12. A process according to claim 1 wherein the acidic catalyst is phosphoric acid on ceramic support.

* * * * *